United States Patent [19]

Daigle

[11] Patent Number: 5,715,162
[45] Date of Patent: Feb. 3, 1998

[54] CORRELATIVE FILTER FOR A SYNCHROPHASER

[75] Inventor: Jeffrey L. Daigle, East Windsor, Conn.

[73] Assignee: United Technologies Corporation, Hartford, Conn.

[21] Appl. No.: 959,825

[22] Filed: Oct. 13, 1992

[51] Int. Cl.⁶ .................... G06G 7/70; B64C 11/34
[52] U.S. Cl. .................. 364/431.01; 364/424.012; 364/431.07; 60/702; 416/34; 416/35; 416/27; 244/180; 244/181; 244/182
[58] Field of Search ............ 364/431.01, 431.04, 364/424.01, 433, 431.02, 423.098, 424.012, 424.016, 431.07, 574; 416/44, 129, 154, 34, 35, 27, 25, 46, 61, 33, 28, 29, 30, 36, 37, 156, 162, 147, 153; 60/702, 700, 701, 705, 904; 244/181, 180, 177, 17.11; 340/946; 73/862.05

[56] References Cited

U.S. PATENT DOCUMENTS

| | | | |
|---|---|---|---|
| 3,589,832 | 6/1971 | Harris et al. | 416/34 |
| 3,693,910 | 9/1972 | Aldi | 244/7 |
| 4,245,955 | 1/1981 | Lambertson | 416/34 |
| 4,345,237 | 8/1982 | Lerche et al. | 416/61 |
| 4,653,981 | 3/1987 | Harner et al. | 416/34 |
| 4,934,825 | 6/1990 | Martin | 364/431.01 |
| 4,947,356 | 8/1990 | Elliott et al. | 364/424.012 |
| 4,948,337 | 8/1990 | Martin et al. | 416/3 |
| 4,958,289 | 9/1990 | Sum et al. | 364/431.01 |
| 5,027,277 | 6/1991 | Schneider | 364/431.01 |
| 5,042,965 | 8/1991 | Niessen | 416/34 |
| 5,213,471 | 5/1993 | Miller et al. | 416/44 |

Primary Examiner—Jacques Louis-Jacques
Attorney, Agent, or Firm—Richard H. Kosakowski, Esq.; Holland & Bonzagni, P.C.

[57] ABSTRACT

A synchrophaser for a multi-engine, propeller-driven aircraft including a filter that automatically compensates for misalignment of blade position sensor tabs through derivation and application of a correlation coefficient. The correlation coefficient is calculated in a self-adjustment derivation, utilizing a dynamic tolerance band, providing increased accuracy in propeller speed determination. The correlation coefficient brings about an apparent uniform distribution of blade position sensors, as seen by the synchrophaser, thus eliminating a primary source of cyclic propeller speed disturbances. The correlative filer accomplishes its task without the phase shifting normally encountered in other digital filtering technique.

10 Claims, 5 Drawing Sheets

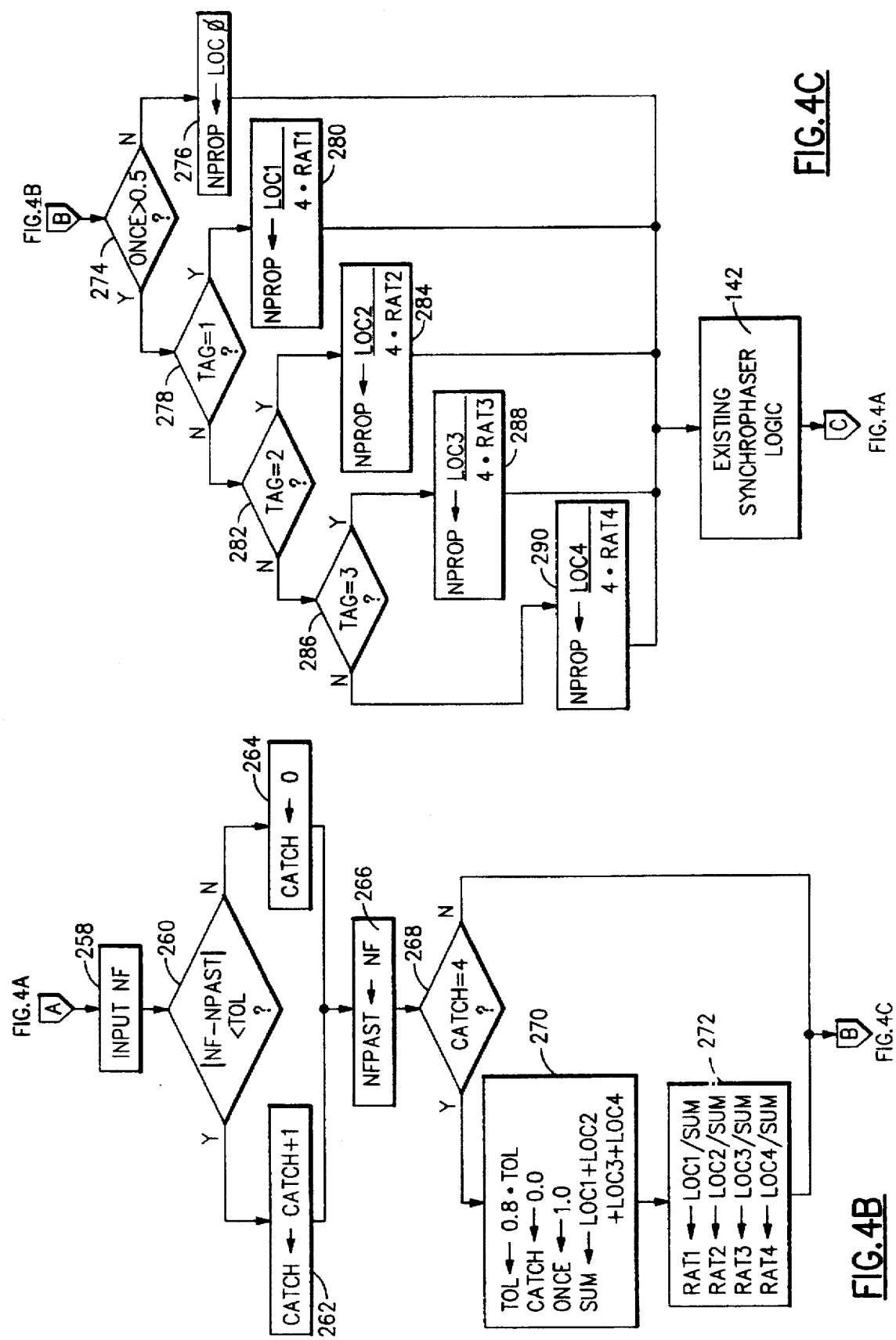

| BLADE PAIR | $T_{12}$ | $T_{23}$ | $T_{34}$ | $T_{41}$ |
|---|---|---|---|---|
| ST SAMPLE TIME | 10 | 12 | 8 | 10 |
| RAT RATIOS | 0.25 | 0.30 | 0.20 | 0.25 |
| CC CORRELATION COEFFICIENT | 1.0 | 0.83 | 1.25 | 1.0 |
| CT CORRECTED TIME OUTPUT | 10 | 10 | 10 | 10 |

WHERE:

$$SUM = T_{12} + T_{23} + T_{34} + T_{41}$$

$$RAT(XY) = \frac{T(XY)}{SUM}$$

$$CC(xy) = \frac{1}{4 * RATIO(xy)}$$

$$CT(XY) = ST(xy) * CC(XY)$$

ST(XY) = SAMPLE TIME FOR EACH BLADE PAIR
SUM = TOTAL TIME FOR ALL SAMPLE TIMES (i.e., FOR A COMPLETE REVOLUTION OF PROPELLER)
RAT(XY) = RATIO OF EACH BLADE PAIR TIME TO TOTAL TIME
CC(XY) = CORRELATION COEFFICIENT AS CALCULATED PER BLADE PAIR (XY)
CT(XY) = CORRECTED TIME OUTPUT (CORRELATION COEFFICIENT APPLIED)

WHERE:
(XY) REPRESENTS BLADE PAIRS 1 AND 2, 2 AND 3, 3 AND 4, 4 AND 1

FIG.6

CORRELATIVE FILTER FOR A SYNCHROPHASER

TECHNICAL FIELD

This invention relates generally to controls for aircraft engine, propeller speed and phase, and more particularly, to such controls having a correlative filter for use in propeller blade synchrophasing.

BACKGROUND ART

The advent of multi-engine, multi-propeller aircraft has brought with it the problem of objectionable noise levels within the aircraft passenger compartment or cabin. In an attempt to reduce noise levels inside the cabin of multi-engine aircraft, engine speed synchronization and propeller blade phase synchronization is performed.

The cabin noise is manifested in a pulsating or throbbing noise heard inside the cabin. The cause of this noise is the frequency characteristics of the sound generated by the propellers and engines. When the frequency of the sound generated by each propeller differs, the pulsating sound occurs at the beat frequency of the combination of the different frequency sources. For example, on a twin engine aircraft, if one propeller is generating sound at a frequency of 100 Hz and the other is generating sound at a frequency of 101 Hz, the beat frequency is 1 Hz and a pulsating or beating sound is heard at 1 Hz. It is therefore critical to interior cabin noise reduction to match the speed of the propellers to control the frequency of the generated sound.

An engine control unit controls the speed of each engine, making any necessary speed adjustments via an engine speed governor mechanism. This unit synchronizes the engines to a desired speed so that the propellers spin at the same rate, thus causing all the propellers to generate sound at the same frequency. When attempting to reduce noise, the speed of the engines, and therefore propellers, must be closely monitored.

However, speed synchronization is only part of the solution for reducing cabin noise. Another aspect of the pulsating noise is the phase relation of the various propellers, i.e. sound sources. Phase modulation, or varying of the phase relation between propellers, is effective in controlling the amplitude of the resultant generated sound. When the propellers are generating sound in phase, the largest amplitude of generated sound results. When the propellers are generating sound out of phase, some cancellation of generated sound results with significant cancellation occurring at a phase difference of 180 degrees between propellers.

The phase relation between the propellers is determined by the relative position of the blades of each propeller. The blades passing through air as they rotate generate sound. The sound is transmitted radially from the propeller axis, along a line defined by the position of the blade at any specific moment. As such, there is a limited angle of blade positions (measured circularly with the propeller axis at center) that generate noise directed at the aircraft cabin. Blade phasing between propellers, as determined by blade position, is of concern in this angular segment vis-a-vis noise generation.

Although the engines may be synchronized to run at the same speed so that the propellers are generating similar frequency sounds, the positions of the blades of the propellers may not be synchronized. In such a situation, it is the difference between corresponding blade positions of each individual propeller, when measured in the angular segment above mentioned, that is responsible for the level of sound heard in the cabin. If the propellers are left to run asynchronously, with no inter-propeller synchronization, the cabin noise levels can increase due to sound waves generated by the out-of-phase propellers. By regulating the phase relation between the propellers, the sound heard in the cabin can be abated. Synchronization of blade phase among the individual propellers synchronizes the phase of the sound sources (i.e., the propellers). This reduces the sound transmitted to the aircraft cabin from the propellers. This process is known as synchrophasing.

In synchrophasing, as disclosed in U.S. Pat. Nos. 3,589,832, 4,653,981, and 4,947,356, individual propellers on multi-engine aircraft are automatically controlled to maintain a fixed phase relationship, as determined by individual blade positions, relative to a reference propeller. The synchrophaser regulates all the propellers to synchronize their speed and blade phasing. When attempting to synchronize normally asynchronous devices such as the propellers, the synchrophaser must first establish the control element to which all the propellers are synchronized. In multi-propeller aircraft designs, one propeller is designated as a master and the remainder are considered slaves to the master. An optimum blade position is established by the master propeller and becomes the reference parameter. The speed of the propellers is regulated to ensure that a blade from each slave propeller passes through the optimum position at precisely the same time with reference to the master propeller.

The synchrophaser works in superposition to the engine speed control. The synchrophaser adjusts the speed of out-of-phase slave propellers as necessary to control the phase relation of the slave propellers relative to the reference master propeller. Individual propeller speed adjustment is accomplished through control of a pitch-change mechanism. This mechanism varies the pitch of the individual blades, causing the angle of attack of the blade to increase or decrease, thereby increasing or decreasing blade speed and therefore propeller speed. Out-of-phase propellers are sped up or slowed down until they come into the desired phase alignment. These propeller speed adjustments result in rotation of all the propellers about their respective axes at the same angular velocity, with the individual blades of each propeller continuously and simultaneously passing through the same angular positions. Optimal angular positions are determined through analysis of the acoustical characteristics of the aircraft fuselage and will differ for different aircraft designs. This optimal angular position is a fixed parameter in the synchrophaser algorithm.

In order for synchrophasing to be effective, the synchrophaser, which is typically a microprocessor based digital control system, must determine the instantaneous positions of the individual propeller blades and then derive the phase relation of the blades of each slave propeller with respect to a corresponding blade of the master propeller. Blade position sensing is typically accomplished through use of a magnetic sensor which determine the positions of the blades of each propeller.

Each propeller has associated therewith a blade position sensor unit that includes a rotating sensor ring and a stationary magnetic sensor. The rotating sensor ring is secured on the propeller shaft, such ring having a tab or projection corresponding to each blade of the propeller. (A sensor ring for a four bladed propeller will have four tabs, a sensor ring for a six bladed propeller will have six tabs, and so on.) The sensor ring is keyed so it may only be installed in one orientation, giving a coarse alignment of tabs to blades. The stationary magnetic sensors detect a passing of each tab as the propeller rotates, and an electrical signal is thereby induced in the magnetic sensor. This electrical signal is relayed to the synchrophaser through a hardware interface device (such as an analog to digital converter) and is converted to a digital format to be processed by the synchrophaser.

Sensor ring tab alignment with the corresponding propeller blade and proportionate spacing between tabs is essential to effective operation of the synchrophaser. The synchrophaser synchronizes the phase of the tab sensors, and since there should be an exact correlation between each tab position and the corresponding blade position, the phase of the blades will therefore also be synchronized. Problems, however, can arise where there exists non-uniform tab distribution on a sensor ring.

In a condition of non-uniform tab distribution, the spacing between tabs on the sensor ring is not uniform. When the tabs are not precisely distributed, a cyclic propeller speed disturbance is generated. The speed disturbance occurs because the tab misalignment causes the synchrophaser to receive information from the magnetic sensors which erroneously indicates a change in propeller speed. The synchrophaser derives the propeller speed from the detected positions of the blades by monitoring the time interval between successive tab detections. If the sensor tabs are non-uniformly distributed, and the propeller speed is constant, the timing interval between tab detections will vary, giving the appearance of irregular propeller speed. The synchrophaser responds to these apparent variations in propeller speed and speeds up or slows down the propeller until uniform timing intervals are achieved. This continuing adjustment causes cyclic speed disturbances, resulting in continuous propeller speed adjustments as the synchrophaser attempts to compensate for apparent, but non-existent, speed fluctuations caused by the non-uniform tab distribution. These fluctuations cause the frequency of the sound generated by the propellers to vary. Since the degree and existence of a misaligned condition may vary from propeller to propeller, each propeller will be generating different frequency sounds and bring about the heretofore mentioned pulsating noise heard in the aircraft cabin.

The case of non-uniform tab distribution may be addressed by several approaches. The need for misalignment correction can be avoided altogether in the manufacturing process through imposition of stringent manufacturing specifications and quality control. However, this approach may become disproportionately expensive on an essentially low cost item (the sensor ring). A less expensive approach is incorporation of commonly used digital filtering. However, typical digital filtering techniques cause a phase lag of the processed signal. This effectively is a time delay from when the signal is sensed to when it is processed by the synchrophaser. The commands generated by the synchrophaser are therefore skewed in time as the synchrophaser is always acting on 'old' information, i.e., when the command is calculated, the information that was accurate at the onset of calculation is no longer current. This lag also contributes to the cyclic propeller speed disturbances hereinbefore described.

SUMMARY OF THE INVENTION

Objects of this invention include provision of a correlative filter for a propeller blade synchrophaser which eliminates cyclic propeller speed disturbances caused by non-uniformly distributed propeller blade position sensors. Further objects include the provision of the correlative filter which provides minimal phase shift in propeller blade speed processing, and includes a tolerancing mechanism to provide adaptable, accurate propeller blade speed signals to the synchrophaser.

According to the present invention, a correlative filter for a propeller blade synchrophaser establishes a fixed relationship between actual propeller blade position and blade sensor position to compensate for any misalignment between actual blade position and blade position sensors. A mathematical correlation of the sensed blade positions is performed by the correlative filter to arrive at a correlation coefficient. This correlative process effectively maps the existing sensor ring (presumably with non-uniform tab distribution) onto an ideal sensor ring (having uniform tab distribution) so that the sensor ring appears, to the synchrophaser, to have a uniform tab distribution.

The present invention has utility in that uniform tab distribution results in a more accurate blade speed signal (derived from sensed propeller blade speeds) used in the synchrophaser. The correlation coefficient, therefore, compensates for blade sensor misalignment, thereby reducing the occurrence of cyclic propeller speed disturbances and the associated undesirable noise characteristics heretofore described. The correlative filter effectively combats the problems caused by misalignment of propeller blade sensors while bypassing the phase problems normally associated with other digital filtering techniques.

The correlative filter may be implemented in currently existing synchrophasers. The correlative filter is equally effective when utilized in either a digital or analog fashion, as is appropriate for the desired application. The correlative filter may be implemented via a simple modification in the programming of an existing microprocessor controlled synchrophaser.

Although originally designed for synchrophased propeller control for an aviation application, this invention may be adapted and utilized in a variety of other applications where accurate rotational speed measurement is required.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIGS. 4A–4C are exemplary flowcharts of the correlative filter of FIG. 3;

FIG. 6 is an illustration of an exemplary correlation coefficient derivation by the correlative filter of FIG. 3 using time between blade pairs.

DETAILED DESCRIPTION OF THE INVENTION

Figure 1:
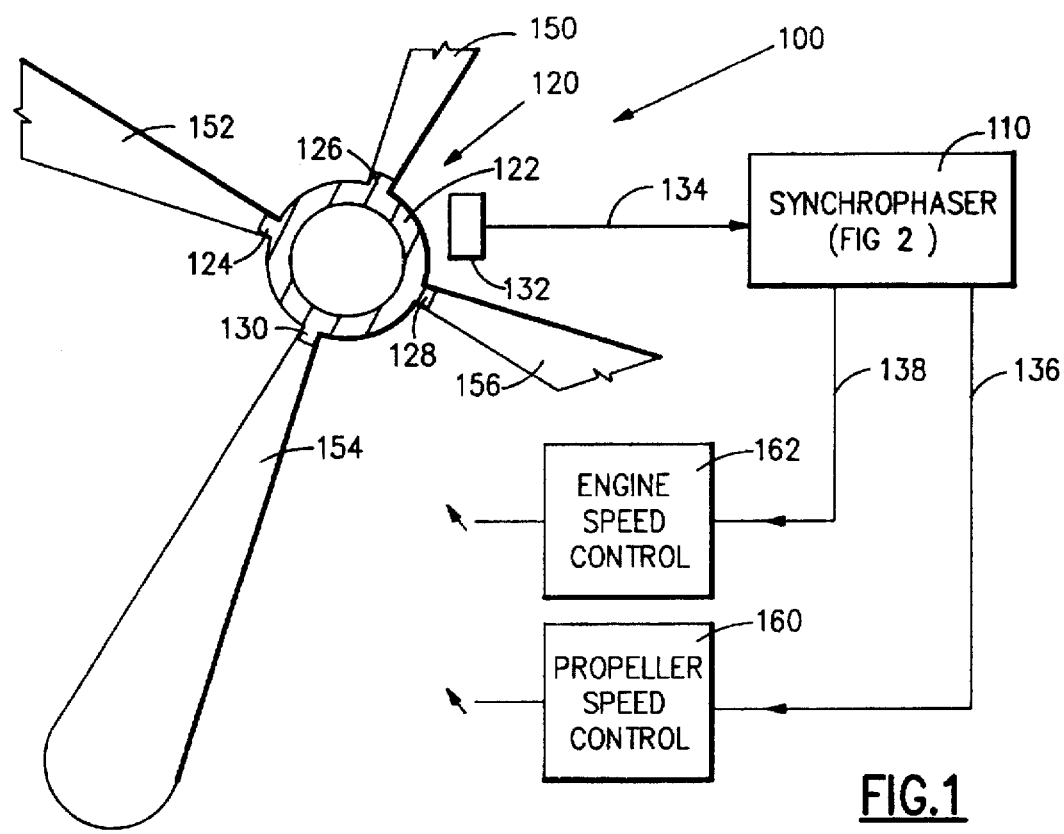
FIG. 1 is an illustration of a synchrophaser system.
Figure 3:
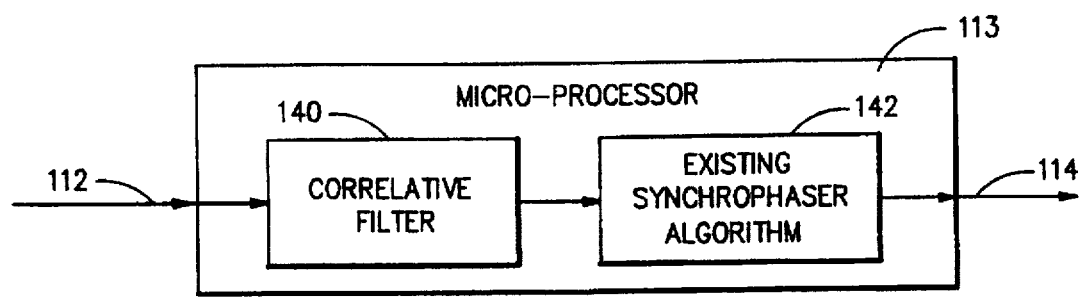
FIG. 3 is an illustration of a synchrophaser apparatus of FIG. 2 having a correlative filter according to the present invention.

A synchrophaser system 100, as illustrated in FIG. 1, consists of a synchrophaser 110 which performs the synchrophaser process, and blade sensor units 120. For simplicity, only one propeller and associated blade sensor unit is illustrated in FIG. 1 et seq., however on an aircraft having a plurality of propellers, it is understood that each propeller has a similar configuration. This embodiment of the invention applies the correlative filter to an aircraft having our variable pitch blades 150, 152, 154, 156 per propeller. Each blade position sensor unit 120 comprises a rotating sensor ring 122, with tabs 124 126 128 130 and a stationary magnetic sensor 132 which in combination detect propeller rotation. The blade position sensor unit 120 is an inductive device whose stationary magnetic sensor 132 detects passing sensor ring tabs 124, 126, 128, 130, thereby inducing an electrical signal responsive to propeller rotation on the signal line 134. This blade pass signal has a pulse-train characteristic when viewed over time. A correlative filter 140 according to the present invention is provided in the synchrophaser 110 (FIG. 3). As is the case for the synchrophaser itself, the correlative filter 140 is executed only upon engagement of the synchrophase mode by the pilot. The correlative filter of the present invention may be added in-line to the execution loop containing the existing synchrophaser algorithm 42.

Figure 2:
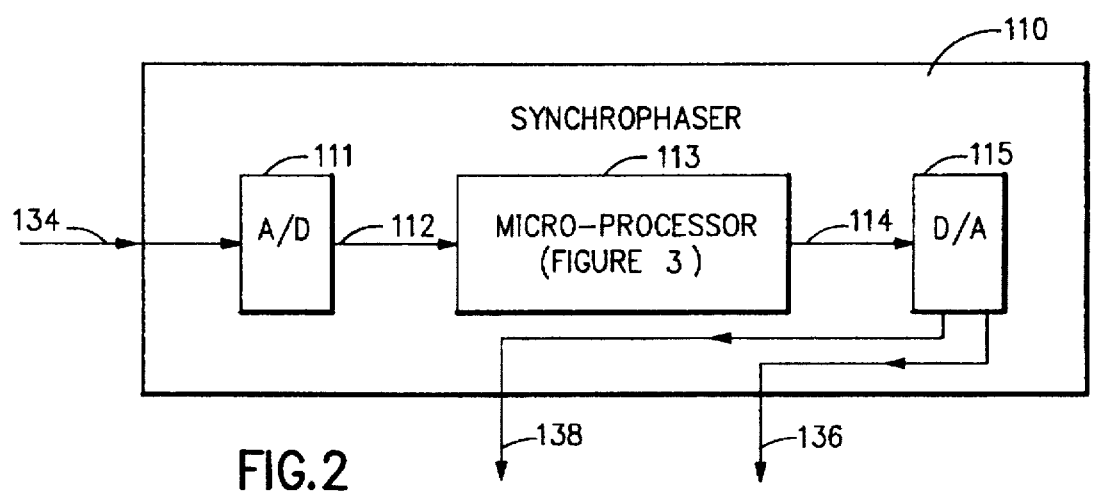
FIG. 2 is an illustration of the micro-processor based synchrophaser apparatus from the synchrophaser system of FIG. 1.

Referring to FIG. 2, the analog blade pass signal on the line 134 is processed by the synchrophaser 110, a microprocessor based device. The blade pass signal is received by the synchrophaser 110 through a standard input/output (I/O) interface. The analog blade pass signal on the line 134 is converted into a digital blade time signal, a conversion which is typically done by a known analog-to-digital ("A/D") converter, on a line 112 usable by the synchrophaser microprocessor. The digital blade time signal on the line has pulse-train characteristics similar to the analog blade pass signal on line 134. The pulses of the blade time signal indicate blade tab passage and the time measured between the pulses is used by the synchrophaser in deriving individual blade speed (and therefore propeller speed) and phase relation between propellers.

The synchrophaser microprocessor 113 further processes the derived speed and phase relation to generate commands on a signal line 114 to regulate the propeller and engine speed controls 160, 162. These commands are formed through error signal generation. The blade speed and phase relation are compared to desired speed and phase respectively and an error is calculated. These error signals become the synchrophaser commands which ultimately drive the propeller and engine speed controls.

The blade speed error and phase error commands on the line 114 are processed for output in a similar fashion to the input processing of the electrical signal hereinbefore described. The digital error commands on line 114 are transformed into electrical (analog) signals on the lines 136, 138 operative to drive the propeller and engine speed controls 160, 162. This transformation is typically performed by a known digital to analog ("D/A") converter 115.

The propeller and engine controls 160, 162 are responsive to the synchrophaser commands on lines 136 and 138 to bring the blade speed and phase relation into compliance with the desired settings thereof. As is generally known in control theory, the error signals, and therefore the corresponding synchrophaser commands, will tend toward zero as the propeller and engine controls cause actual blade speed and phase relation to come into compliance with the desired settings.

Prior to synchrophaser algorithm processing of the blade time signal, the blade time signal is conditioned by the correlative filter 140 (FIG. 3). This filter is in-line with the synchrophaser input on line 112 and, like the synchrophaser, is executed in real-time. The correlative filter is operative to determine any misalignment of the blade position sensor tabs 124, 126, 128, 130 by sampling and correlating the blade time signal and deriving a correlation coefficient based on the sampled data. A correlation coefficient is derived for each blade and is then applied to modify the pulses of the blade time signal to factor out the effects of any non-uniform tab distribution on the blade position sensor ring. The correlation coefficient is operative to correct the blade time signal prior to use in synchrophaser calculation, yielding increased effectiveness and accuracy of synchrophaser operation.

The recursive nature of the correlative filter allows incorporation of a tolerancing mechanism whereby a tolerance band, used in calculation of the correlation coefficient, is constantly adjusted downward toward a narrower tolerance band. This adjustment continues until an optimum tolerance band, and therefore an optimum correlation coefficient, is determined.

Correlation coefficient calculation may not be instantaneous upon synchrophaser engagement, but requires several recursions of the real-time correlative filter. Until a cycle is complete, the correlation coefficient is transparent to the synchrophaser as it is not applied to the blade time signal. As the correlation coefficient serves to augment synchrophaser performance, instantaneous calculation is not critical to synchrophaser operation and the minor delay prior to initial coefficient determination has no detrimental impact on synchrophaser functionality. After this initial coefficient calculation, the correlation coefficient is fully operative and will continue to be calculated and optimized by the correlative filter as heretofore described.

Figure 4A:
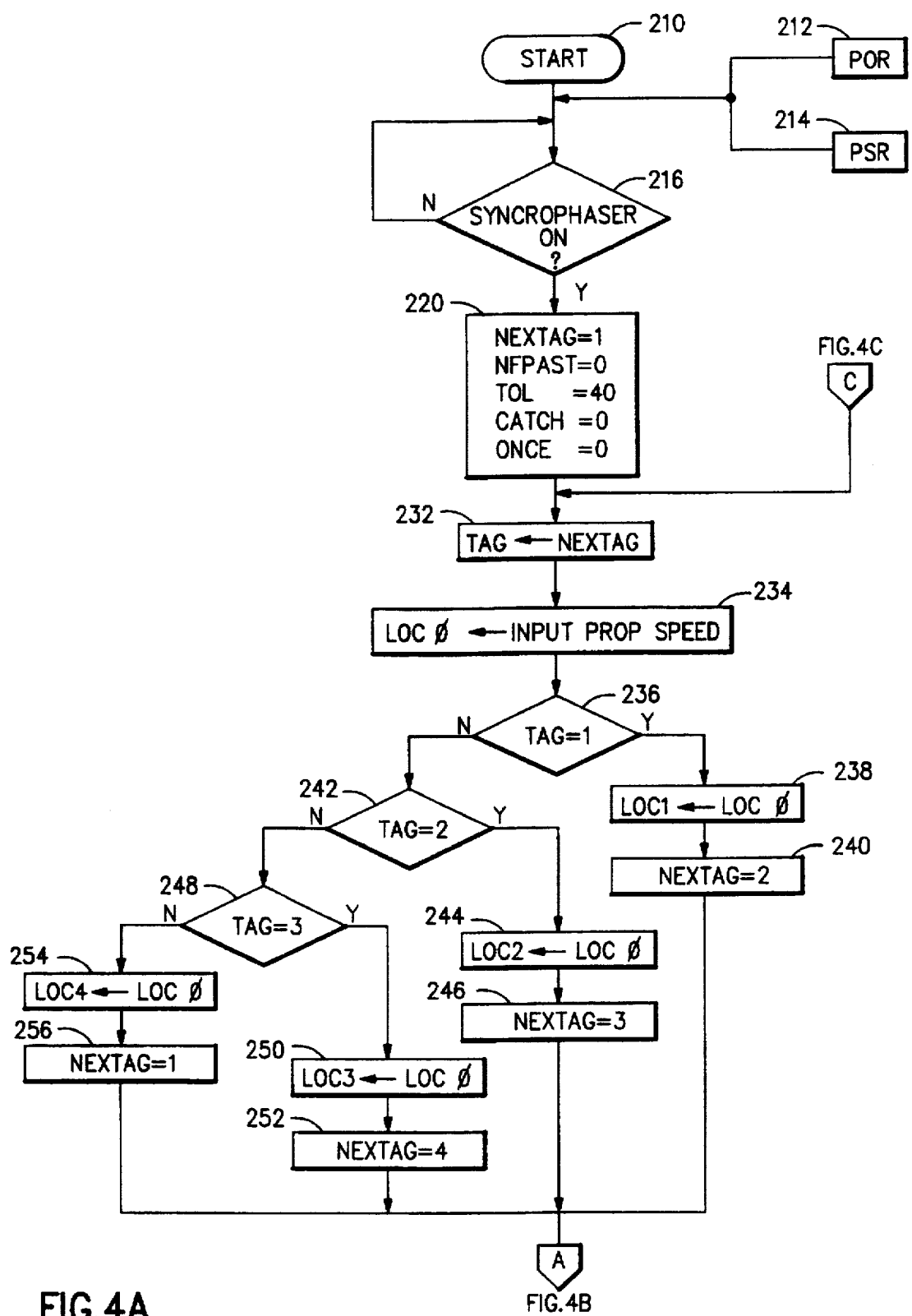

Illustrated in FIG. 4 is a flowchart for an exemplary embodiment of the correlative filter of the present invention. Memory locations for allowing manipulation of both sensed and calculated variables are required for parameters utilized in the embodiment shown, including NEXTAG, NFPAST, TOL, CATCH, ONCE, TAG, NF, LOC0, LOC1, LOC2, LOC3, LOC4, RAT1, RAT2, RAT3, RAT4, SUM, and NPROP.

When synchrophase mode is selected by the pilot, a discrete moment at which to begin correlation is selected. This moment is referred to as the speed tag NEXTAG. This speed tag assigns the first tag number (one) to the first blade time signal pulse processed by the synchrophaser after engagement. The speed tag NEXTAG identifies the blade to which the blade speed corresponds. Incrementing NEXTAG by one allows successive blade speeds to be assigned to successive blade positions. The variable NEXTAG resets after incrementing through the propeller blade count. In other words, on an aircraft having four bladed propellers with four blade position sensor tabs per propeller as in this embodiment of the invention, NEXTAG is initialized to a value of one upon synchrophaser mode engagement, and increments up through four upon receiving successive blade speeds while in its iterative loop. NEXTAG then resets to a value of one and begins incrementing anew.

The variable NFPAST represents the last measured free turbine speed of the engine, i.e. its past value as received in the last real-time microprocessor cycle. This variable is used in combination with NF, the current free turbine speed, to determine any change thereof. Changes in free turbine speed are the control variable against which apparent blade speed changes are evaluated. Inasmuch as the speed of the propeller and the free-turbine speed are directly related, a constant turbine speed produces a correspondingly constant blade speed and any variations in blade speed not reflected in a turbine speed change are attributable to non-uniform sensor tab distributions.

A tolerance TOL is established to determine a band within which free turbine speed is deemed constant. Any change found in free turbine speed, as hereinbefore described, is compared to this tolerance TOL. If the turbine speed change is within the allowable tolerance TOL, the turbine speed is deemed to have been constant for that pass of the recursive loop. This tolerance has an initial value of, for example, forty rotations-per-minute (40 RPMs) for the embodiment described herein, and is downwardly self-adjusting, i.e. only adjustments which narrow the tolerance band, and therefore yield increasing accuracy, are performed.

A counter CATCH is employed to detect 'intolerance' turbine speeds. This counter is set and reset depending on changes in turbine speed. The counter CATCH is initialized to zero and is incremented by one for an 'in-tolerance' speed change. Any turbine speed change found to be out of tolerance resets the counter to zero. This implementation allows CATCH to increase only for consecutive 'in-tolerance' free turbine speed changes. CATCH increments by one for each 'in-tolerance' speed change until reaching a threshold value at which point the counter CATCH resets, a variable ONCE is set indicating the correlation coefficient has been calculated at least one time, and the tolerance band TOL is reduced by, for example, 20%. The threshold value for the counter CATCH is the same as that for NEXTAG, i.e., the number of blades of the propeller. This 20% downward adjustment of the tolerance TOL is repeated until the optimized tolerance for that particular blade sensor is achieved, i.e., when four consecutive 'in-tolerance' speed changes at a narrower tolerance can no longer be attained.

Until four consecutive in-tolerance turbine speed changes have occurred (i.e., until ONCE has a value of one), the correlation coefficient is not applied and the blade speed value is allowed to pass through to the synchrophaser without correction. When four consecutive in-tolerance turbine speed changes have occurred, (i.e., when CATCH equals four), a variable ONCE is set to one and CATCH is reset to zero, indicating four consecutive in-tolerance speed changes. At this point the correlation coefficient is calculated and applied to correct for any non-uniformity in the blade sensor ring tab distribution as described hereinbelow.

Memory locations LOC0, LOC1, LOC2, LOC3, and LOC4 store blade speeds as indicated by each tab of the blade sensor ring. LOC0 is used as a temporary location into which blade speed is first stored. The other LOC memory locations correspond in number to the number of blades on the propeller. In this embodiment, there are four propellers hence four LOC variables LOC1, LOC2, LOC3, and LOC4. The value in LOC0 is stored into either LOC1, LOC2, LOC3, or LOC4 depending on the value of TAG. This establishes a sequential correspondence between the blade time signal and blade sensor ring tabs .i.e., the first blade speed is assigned to LOC1 and the next blade speed is assigned to LOC2 and so on until all four blade speeds are sequentially captured and stored. Placement of individual blade speeds into discrete locations allows for application of a correlation coefficient for each blade sensor tab. Location SUM stores the sum of the individual blade speeds LOC1, LOC2, LOC3, and LOC4 for later use in calculation of the correlation coefficient.

Memory locations RAT1, RAT2, RAT3, and RAT4 represent the ratio of each blade speed, LOC1, LOC2, LOC3, LOC4 respectively, to the sum of the blade speeds SUM. These ratios are used in calculating each correlation coefficient.

NPROP contains the propeller speed which is to be passed to the synchrophaser. When the aforementioned criteria for correlation coefficient calculation is met, i.e., ONCE has a value of one, NPROP contains corrected propeller speeds, which are passed to the synchrophaser. If that criteria has not been met, i.e., ONCE has a value of zero, NROP contains the uncorrected propeller speed, as stored in LOC0, to pass through to the synchrophaser without correction by the correlation coefficient.

The operation of the correlative filter in this embodiment of the present invention as illustrated by the flowchart in FIG. 4 is described hereinbelow in further detail.

Correlative filter entry is interrupt controlled and entry is vectored to a start point 210 of the filter program. The correlative filter is typically entered upon synchrophaser power-up when the synchrophaser system 100 (FIG. 1) is turned on; when the synchrophaser processor has issued a power on reset interrupt signal ("POR") in a step 212 to reset the synchrophaser; or when the synchrophaser processor has detected a power supply interruption and an interrupt signal ("PSR") is issued in a step 214 to reset the synchrophaser.

After successful program entry, synchrophase mode engagement is monitored in a test 216. Normal synchrophaser mode engagement occurs when the synchrophaser is engaged manually by the pilot. If the synchrophaser mode is engaged, initialization of filter variables and logic is performed in a step 220. Initialization in step 220 is performed only once upon mode engagement and falls outside the recursive loop, which commences at step 232 of the correlative filter.

The initialization step 220 assigns initial values to correlative filter variables including: NEXTAG, the speed tag, which is set to 1; NFPAST, the last measured free turbine speed, which is set to 0; TOL, the tolerance band, which is set to 40; CATCH, the number of consecutive constant turbine speed measurements (i.e. within the tolerance band TOL) which is set to 0; and ONCE, indicating initial calculation of the correlation coefficients, which is set to zero.

Once initialization is complete, the recursive loop portion of the algorithm of FIG. 4 is entered. The value of the speed tag NEXTAG is stored into a temporary variable TAG in a step 232. Propeller speed is then stored in the variable LOC0 in a step 234. The variable TAG is interrogated to coordinate a blade time signal pulse with the proper individual blade speed. A test 236 is performed to determine if TAG has a value of one. If TAG is equal to one, indicating processing of blade one, the value in LOC0 is stored into memory location LOC1 in a step 238. NEXTAG is set to a value of two in a step 240 and the loop continues with step 258. If TAG is not equal to one, a test 242 is performed to determine if TAG is equal to two. If TAG is equal to two, indicating processing of blade two, the value in LOC0 is stored into memory location LOC2 in a step 244. NEXTAG is set to a value of three in a step 246 and the loop continues with step 258. If TAG is not equal to two, a test 248 is performed to determine if TAG is equal to three. If TAG is equal to three, indicating processing of blade three, the value in LOC0 is stored into memory location LOC3 in a step 250. NEXTAG is set to a value of four in a step 252 and the loop continues with step 258. If TAG is not equal to three, the speed for blade four is processed. The value in LOC0 is stored into memory location LOC4 in a step 254. NEXTAG is set back to a value of one in a step 256 and the loop continues with step 258. On the first pass after initialization, NEXTAG has a value of one, thus establishing a blade time signal pulse to blade relationship, which continues sequentially throughout correlative filter calculation.

At this point, current free turbine speed is read into the variable NF in a step 258. A determination of any free turbine speed change is made in a test 260 by comparing the current turbine speed to the past value turbine speed NFPAST. Any change in turbine speed is compared to the tolerance TOL in this test 260. If the turbine speed change is within the tolerance band, i.e., the value of the change is less than the tolerance TOL, the 'in-tolerance' counter CATCH is incremented by one in a step 262. If the turbine speed change is not within the tolerance band, CATCH is reset to zero in a step 264. This is operative, as described hereinbefore, to capture successive 'in-tolerance' turbine speeds for the turbine to be deemed to be at constant speed. The current turbine speed NF is then stored in NFPAST in a step 266 to serve as the past value of turbine speed NF for the next cycle of the recursive loop of the correlative filter.

The constant turbine speed counter CATCH is interrogated in a test 268 to determine if it has reached its threshold value as hereinbefore described. In this embodiment, this threshold is four, reflecting the requirement for four consecutive constant turbine speeds to allow correlation coefficient calculation. If CATCH has a value less than four, coefficient calculation is bypassed and interrogation is performed in a test 274 (FIG. 4C) to determine if a previously calculated coefficient is to be applied (i.e., the variable ONCE is interrogated in a test 274, as hereinbelow described). If CATCH has a value equal to four, correlation coefficient calculation is performed. In a step 270, the tolerance band TOL is narrowed, the counter CATCH is reset to zero, and ONCE is set to one. The tolerance band TOL is downwardly adjusted by 20% to increase the accuracy of future correlation coefficient calculations. A summation of the individual blade speeds LOC1, LOC2, LOC3, and LOC4) is performed also in the step 270 and stored in the variable SUM. The ratio RAT1, RAT2, RAT3, and RAT4) of the individual blade speeds LOC1, LOC2, LOC3, and LOC4 respectively) to the whole SUM is determined in a step 272. These ratios, part of the formulation of the correlation coefficient, are determined in Equation 1 as follows:

$$SUM = LOC1 + LOC2 + LOC3 + LOC4$$

$$RATX = \frac{LOCX}{SUM} \qquad \text{[Equation 1]}$$

where:

RATX is the ratio RAT1, RAT2, RAT3, or RAT4, and

LOCX is the corresponding blade speed LOC1, LOC2, LOC3, or LOC4.

Referring to FIG. 4C, the variable ONCE is interrogated in a test 274 to determine if the correlation coefficient is to be applied. If ONCE has a value of zero (i.e., less than 0.5), a valid correlation coefficient has not yet been calculated, hence it is not applied. The current blade speed LOC0 is stored into the variable NPROP in a step 276 and is thereby passed, uncorrected, to the algorithm 142 (FIG. 3). When ONCE has a value of one (i.e., greater than 0.5), the correlation coefficient is applied to the blade speeds. The value of TAG is then examined to determine which individual blade speed is to be corrected. In test 278, TAG is examined to see if blade one is to be processed (i.e., TAG is examined to see if it has a value of one). If TAG is equal to one, the correlation coefficient is applied to the blade speed for blade one in a step 280. If TAG is not equal to one, a test 282 to determine if blade two is to be processed. If TAG is equal to two, the correlation coefficient is applied to the blade speed for blade two in a step 284. If TAG is not equal to two, a test 286 to determine if blade three is to be processed. If TAG is equal to three, the correlation coefficient is applied to the blade speed for blade three in a step 288. If TAG is not equal to three, blade four is to processed and the correlation coefficient is applied to the blade speed for blade four in a step 290. The corrected blade speed values are deposited in NPROP to be passed on to the synchrophaser algorithm 142. Formulation for the individual blade speed correlation coefficient application is shown in Equation 2 as follows:

$$NPROP = LOCX * \frac{1}{4 * RATX} \qquad \text{[Equation 2]}$$

where:

RATX is the appropriate ratio (RAT1, RAT2, RAT3, RAT4) to apply to the blade speed in question (LOC1, LOC2, LOC3, LOC4), as determined by the value of TAG, in the calculation of NPROP, the corrected blade speed which is to be passed on to the synchrophaser.

The actual correlation coefficient, due to its dynamic nature, is not stored in a separate variable in the flowchart of FIG. 4C, but rather, is a culmination of several steps, including: establishing correspondence of blade speeds to blades (using LOC0, LOC1, LOC2, LOC3, and LOC4); determining constant turbine speeds (using CATCH); determining the ratio of individual speed samples between each other (using RAT0, RAT1, RAT2, RAT3, RAT4, and SUM); and formulation of and application of the derived individual coefficients prior to sending blade speeds on to the synchrophaser for further processing.

After processing by the correlative filter, whether the correlation coefficient has been applied or not, the propeller speed values are passed on for processing by the synchrophaser. When the synchrophaser has completed one pass of the algorithm, control is returned to the start of the recursive loop. That is, as this is a real-time application, the correlative filter and synchrophaser are synchronous, and their respective cycles are executed within the same recursive loop. The recursive loop comprises steps and tests 232 through 290 and is continually repeated while synchrophase mode is engaged.

Another benefit of this design is evident in the phase lag of the processed blade speed signals. When utilizing typical digital filtering methods, a phase lag is inevitably encountered as hereinbefore described. As is known in the art, this is due to the fact that digital filter implementations require many real time cycles to reach their full effect. The design of the correlative filter allows application of the correlation coefficient to be completed in the span of one real-time, recursive loop cycle (once a valid correlation coefficient is attained). As such, there is no phase lag in transport of blade speed data to the synchrophaser due to filter processing. The correlative filter design eliminates phase lag and its subsequent effect on phase holding performance.

The correlative filter derivation of the correlation coefficient can be based on either time or speed measurements, depending on the type of signal that is to be processed by the synchrophaser. In the flowchart presented in FIG. 4 is illustrated a correlation coefficient derivation in terms of instantaneous blade speed. The following example derives the correlation coefficient using the amount of time between blade passes. In either implementation, the operation of the correlative filter is identical as the correlation coefficient is unitless.

Figure 5:
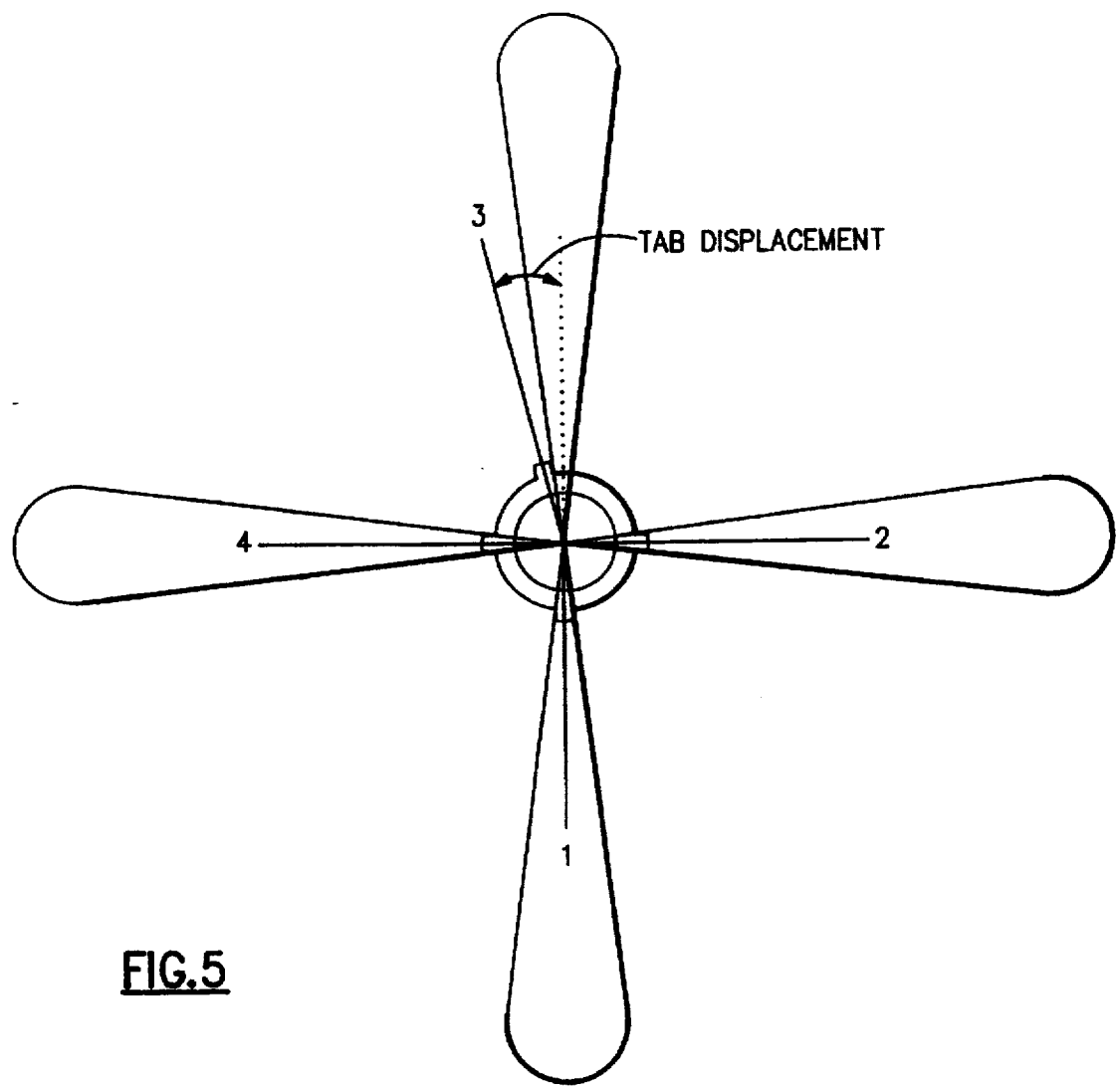
FIG. 5 is an illustration of a typical propeller blade identification and sensor tab misalignment.

In the example illustrated in FIGS. 3 and 4, the correlation coefficient is derived using time between blade passes. With blades identified as 1, 2, 3 and 4, the time between sequential blade passes is indicated by $T_{xy}$, where xy represents sequential individual blade pairs (i.e., 1 and 2, 2 and 3, 3 and 4, 4 and 1). Any displacement from a uniform tab distribution will produce irregular blade time samples. In FIG. 5 is illustrated blade identification and blade sensor ring tab displacement (from uniform distribution) and in FIG. 6 illustrates a table containing the sample times, the calculated ratios, the correlation factors and the corrected time output to the synchrophaser.

This invention of a correlative filter has been illustrated and described with respect to a specific embodiment thereof. It is to be understood, however, by one skilled in the art that this is not an exclusive embodiment. Although optimized for use in connection with a synchrophaser for four-bladed propellers on a multi-propeller aircraft, the correlative filter may be used in any application where a continuous, accurate speed signal is desired. The rotating sensor ring portion of the blade position sensor unit in this embodiment, has been described as possessing tabs. It should be understood by one skilled in the art that such a tab configuration is not exclusive but is merely representative of that used in this embodiment of the invention. The rotating portion of the blade position sensor unit need possess surfaces, complimentary to the stationary portion of the blade position sensor unit which, when using the rotating and stationary portions in combination, will detect propeller rotation and generate a blade time signal in the appropriate medium (electronic or otherwise). It should further be understood by one skilled in the art that the foregoing and various other changes, omissions and additions may be made without departing from the spirit and scope of the invention.

I claim:

1. A synchrophaser providing control of the speed and phase relation of a plurality of propellers via direct regulation of engine and propeller speed, each propeller having a plurality of variable pitch blades, comprising:

control means for controlling propeller speed, said control means being responsive to one or more signals indicative of a commanded propeller speed;

blade sensor means for providing a blade time signal indicative of propeller rotation, said blade sensor means having a stationary portion for detecting propeller rotation and having a rotating portion which rotates in direct correspondence to the propeller, said rotating portion of said blade sensor means having a plurality of surfaces in aligned combination with said blades, said surfaces being equal in number to the number of said blades on each said propeller; and signal processing mean, responsive to said blade time signal, for receiving said blade time signal and for providing to said control means said one or more signals indicative of a commanded propeller speed, and for correlating any non-uniform distribution of said surfaces to establish an apparent uniform distribution of said surfaces, thereby preventing unnecessary and erroneous propeller speed adjustments by said control means in response to any non-uniformity in a distribution of said surfaces.

2. The synchrophaser as described in claim 1 wherein said signal processing means further comprises means for deriving a correlation coefficient, said coefficient being applied to said blade time signal prior to processing of said blade time signal, and said coefficient being calculated and applied in real-time, resulting in minimal phase lag in blade time signal processing.

3. The synchrophaser as described in claim 1 wherein said signal processing means further comprises means for providing a tolerancing mechanism to allow optimal compensation for any non-uniformity in said rotating portion, wherein a self-adjusting tolerance band is employed to dynamically and continuously optimize said correlation coefficient.

4. The synchrophaser as described in claim 1 wherein said blade sensor means is an inductive device operative to magnetically sense propeller rotation and generate said blade time signal, wherein said stationary portion is magnetic, said rotating portion is metallic and said blade time signal is electrical.

5. The synchrophaser as described in claim 1 wherein said control means comprises a engine control unit and a propeller speed control unit, wherein said engine control unit is operative to regulate engine speed and propeller speed control unit is operative to regulate the pitch of said variable pitch blades thereby regulating propeller speed.

6. A synchrophaser providing control of the speed and phase relation of a plurality of propellers, each propeller having a plurality of variable pitch blades, comprising:

control means, responsive to one or more signals indicative of a commanded propeller speed, for controlling propeller speed, said control means including an engine control unit and a propeller control unit;

blade sensor means for providing a blade time signal indicative of propeller rotation, said blade sensor means having a magnetic stationary portion for detecting propeller rotation and having a metallic rotating portion which rotates in direct correspondence to the propeller, said metallic rotating portion of said blade sensor having a plurality of surfaces in aligned combination with said blades, said surfaces being equal in number to the number of said blades on each said propeller; and signal processing means, responsive to said blade time signal, for receiving said blade time signal and for providing one or more signals indicative of a commanded propeller speed to said control means, for correlating non-uniform distribution of said surfaces, thereby establishing an apparent uniform distribution of said surfaces and preventing unnecessary and erroneous propeller speed adjustments by said control means in response to the non-uniformity in said surfaces, for deriving a correlation coefficient and applying said coefficient to said blade time signal prior to processing of said blade time signal, said coefficient being derived and applied in real-time, resulting in minimal phase lag in blade time signal processing, and for providing a tolerancing mechanism, wherein a self-adjusting tolerance band dynamically and continuously optimizes said correlation coefficient.

7. A method for correcting an erroneous propeller rotation signal generated from non-uniform distribution of a rotational sensor portion of synchrophaser apparatus, the method comprising the steps of:

sampling rotation of said rotational sensor;

determining any deviation from uniform distribution of said rotational sensor by establishing a reference rotation against which rotation of said rotational sensor is compared;

averaging of said rotation samples;

compensating for said deviation by correlating detected rotation of said rotational sensor to average rotation of said sensor;

calculating a coefficient representative of said correlation to be applied to said signal from said rotational sensor; and modifying said signal, prior to utilization of said signal by said synchrophaser apparatus, by applying said coefficient.

8. The method as described in claim 7 wherein said coefficient is continuously optimized by narrowing a tolerance band used in said determination of said deviation, said tolerance band narrowing until optimal tolerance is achieved.

9. A method for correcting an erroneous signal generated from non-uniform distribution of a rotational sensor prior to processing of said erroneous signal by a control apparatus, the method comprising the steps of:

sampling rotation of said rotational sensor;

determining any deviation from uniform distribution of said rotational sensor by establishing a reference rotation against which rotation of said rotational sensor is compared;

averaging of said rotation samples;

compensating for said deviation by correlating detected rotation of said rotational sensor to average rotation of said sensor;

calculating a coefficient representative of said correlation to be applied to said signal from said rotational sensor; and modifying said signal prior to utilization of said signal by said control apparatus through application of said coefficient.

10. The method as described in claim 9 wherein said coefficient is continuously optimized by narrowing a tolerance band used in said determination of said deviation, said tolerance band narrowing until optimal tolerance is achieved.

* * * * *

UNITED STATES PATENT AND TRADEMARK OFFICE
CERTIFICATE OF CORRECTION

PATENT NO. : 5,715,162
DATED : February 3, 1998
INVENTOR(S) : JEFFREY L. DAIGLE

It is certified that error appears in the above-identified patent and that said Letters Patent is hereby corrected as shown below:

In the Abstract, line 5, change "self-adjustment" to --self-adjusting--.

In the Abstract, line 13, change "technique" to --techniques--.

Column 5, line 7, change "124 126 128 130" to --124, 126, 128, 130--.

Column 5, line 29, change "converter" to --converter 111--.

Column 5, line 30, change "the line has" to --the line 112 has--.

Column 7, line 52, change "L000" to --LOC0--.

Column 7, line 61-62, change "LOC1, LOC2, LOC3, and LOC4" to --(LOC1, LOC2, LOC3, and LOC4)--.

Column 8, line 44, change "L000" to --LOC0--.

Column 8, line 48, change "L000" to --LOC0--.

Column 8, line 62, change "L000" to --LOC0--.

Column 9, line 6, change "speed to the" to --speed NF to the--.

Column 9, line 35, change "LOC1, LOC2," to --(LOC1, LOC2,--.

Column 9, line 37, change "ratio RAT1" to --ratio (RAT1--.

Column 9, line 38, change "speeds LOC1," to --speeds (LOC1,--.

Column 10, line 25, change "L000" to --LOC0--.

Claim 1, Col. 11, line 50, change "mean" to --means--.

UNITED STATES PATENT AND TRADEMARK OFFICE
CERTIFICATE OF CORRECTION

PATENT NO. : 5,715,162
DATED : February 3, 1998
INVENTOR(S) : JEFFREY L. DAIGLE

It is certified that error appears in the above-identified patent and that said Letters Patent is hereby corrected as shown below:

Claim 6, Col. 12, line 31, change "sensor having" to —sensor means having—.

Signed and Sealed this

Twelfth Day of May, 1998

Attest:

BRUCE LEHMAN

Attesting Officer

Commissioner of Patents and Trademarks